United States Patent
Leggette et al.

(10) Patent No.: US 9,065,820 B2
(45) Date of Patent: Jun. 23, 2015

(54) VALIDATING A CERTIFICATE CHAIN IN A DISPERSED STORAGE NETWORK

(71) Applicant: CLEVERSAFE, INC., Chicago, IL (US)

(72) Inventors: Wesley Leggette, Chicago, IL (US); Jason K. Resch, Chicago, IL (US); Bart Cilfone, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 0 days.

(21) Appl. No.: 14/030,354

(22) Filed: Sep. 18, 2013

(65) Prior Publication Data

US 2014/0020082 A1  Jan. 16, 2014

Related U.S. Application Data

(63) Continuation of application No. 13/288,076, filed on Nov. 3, 2011, now Pat. No. 8,627,065.

(60) Provisional application No. 61/411,478, filed on Nov. 9, 2010.

(51) Int. Cl.
  *H04L 29/06* (2006.01)
  *G06F 3/06* (2006.01)
  *G06F 11/10* (2006.01)

(52) U.S. Cl.
  CPC .......... *H04L 63/0823* (2013.01); *G06F 3/0614* (2013.01); *G06F 3/0647* (2013.01); *G06F 3/067* (2013.01); *G06F 2211/1057* (2013.01); *G06F 11/1076* (2013.01)

(58) Field of Classification Search
  CPC .................................................... H04L 9/3265
  USPC ................................................................ 726/10
  See application file for complete search history.

(56) References Cited

U.S. PATENT DOCUMENTS

| | | | | |
|---|---|---|---|---|
| 6,134,550 A | * | 10/2000 | Van Oorschot et al. | 1/1 |
| 7,290,133 B1 | * | 10/2007 | Montgomery | 713/156 |
| 7,636,724 B2 | | 12/2009 | de la Torre et al. | |
| 8,285,878 B2 | * | 10/2012 | Gladwin et al. | 709/246 |

(Continued)

OTHER PUBLICATIONS

Wikipedia's definition of Digital Signature (Screen Captured on Jun. 16, 2007, https://web.archive.org/web/20070616183708/http://en.wikipedia.org/wiki/Digital_signature).*

(Continued)

*Primary Examiner* — Harris Wang
(74) *Attorney, Agent, or Firm* — Garlick & Markison; Timothy W. Markison

(57) ABSTRACT

A method begins by a processing module receiving a certificate chain and determining whether at least one of one or more signed certificates of the chain has a valid signature. When the at least one of the one or more signed certificates has a valid signature, the method continues with the processing module identifying one or more certificate authorities (CA) to produce identified CAs, accessing registry information that includes one or more realm identifiers (IDs) and a plurality of trusted CA IDs, determining whether one or more of the identified CAs is a trusted CA, and when the one or more of the identified CAs is a trusted CA, indicating that the certificate chain is valid, identifying a realm ID based on a trusted CA ID, and generating certificate chain validation information to include the realm ID, trusted CAs, and the indication of the validity of the certificate chain.

12 Claims, 9 Drawing Sheets

(56) References Cited

U.S. PATENT DOCUMENTS

2002/0152382 A1* 10/2002 Xiao .............................. 713/173
2003/0212888 A1* 11/2003 Wildish et al. ................ 713/158
2005/0262345 A1* 11/2005 Moreau ......................... 713/173

OTHER PUBLICATIONS

Application-oriented cross-CA certificate trust Yihong Long ; Zhihong Tang ; Xu Liu Information Theory and Information Security (ICITIS), 2010 IEEE International Conference on DOI: 10.1109/ICITIS.2010.5689480 Publication Year: 2010 , pp. 354-357.*

Freudenthal, Eric, et al. "dRBAC: distributed role-based access control for dynamic coalition environments." Distributed Computing Systems, 2002. Proceedings. 22nd International Conference on. IEEE, 2002.*

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

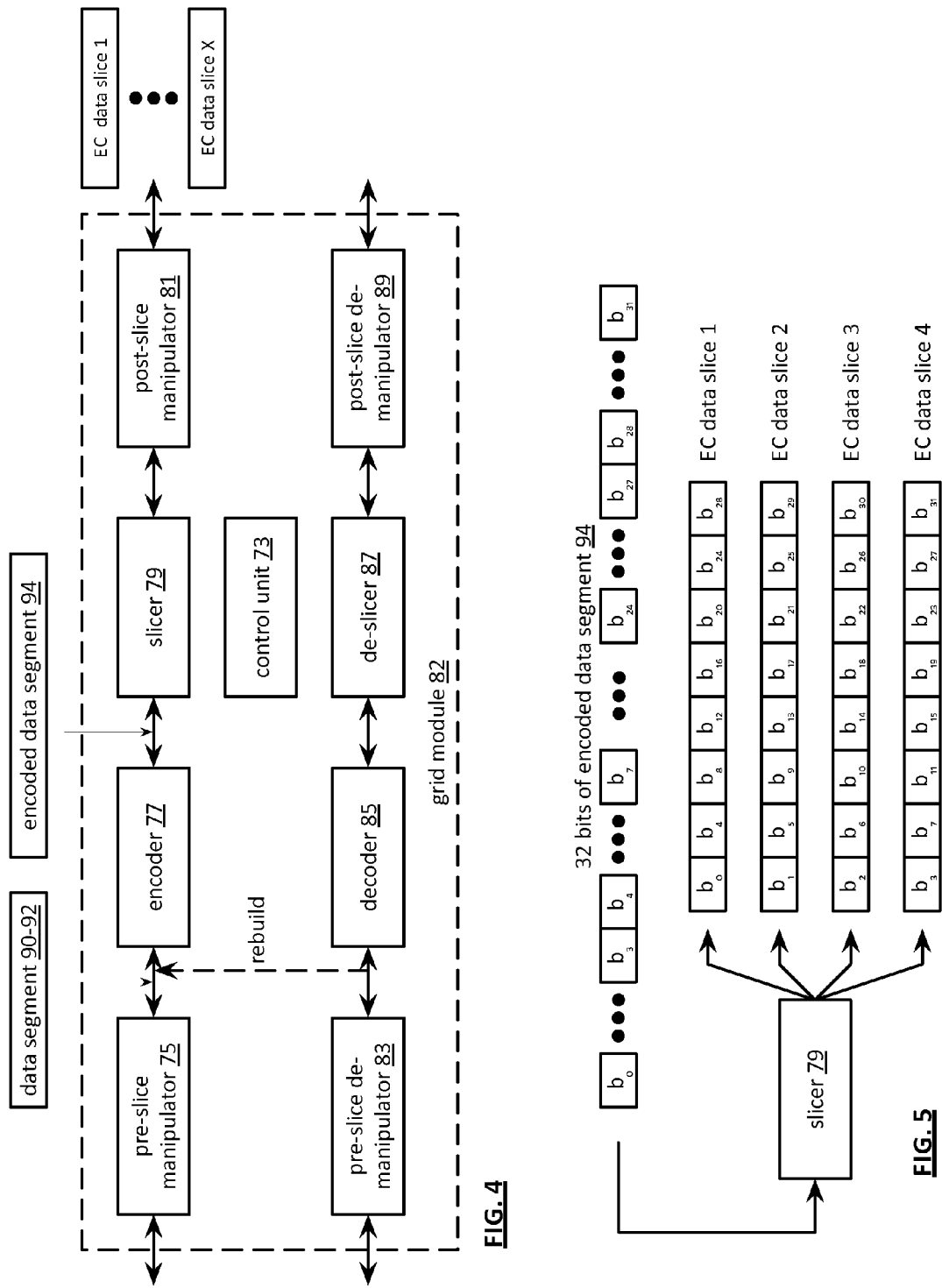

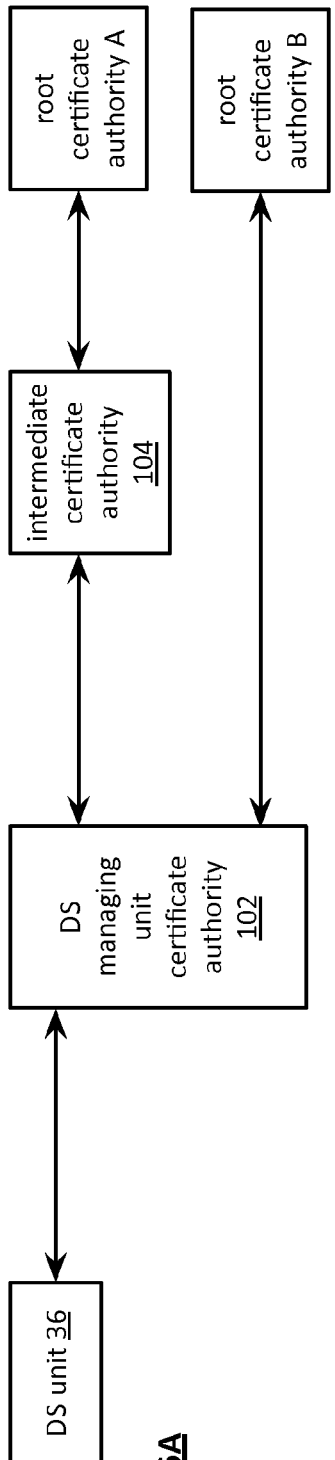
FIG. 6A
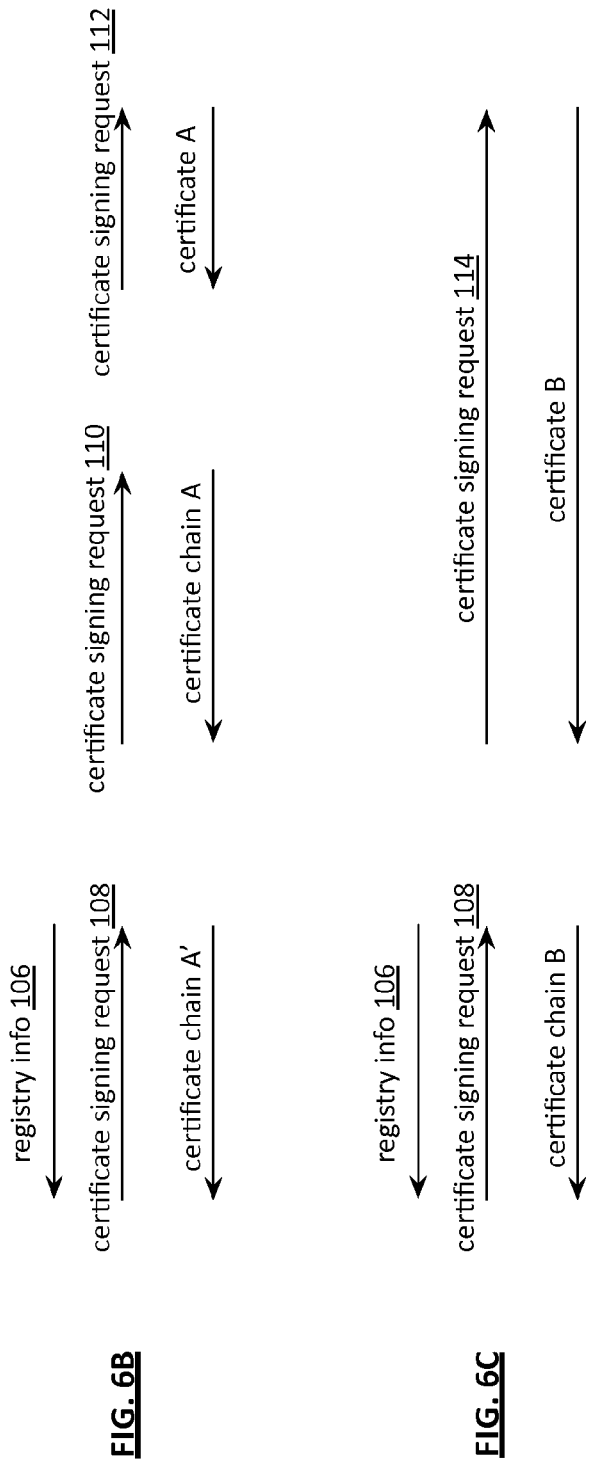
FIG. 6B
FIG. 6C

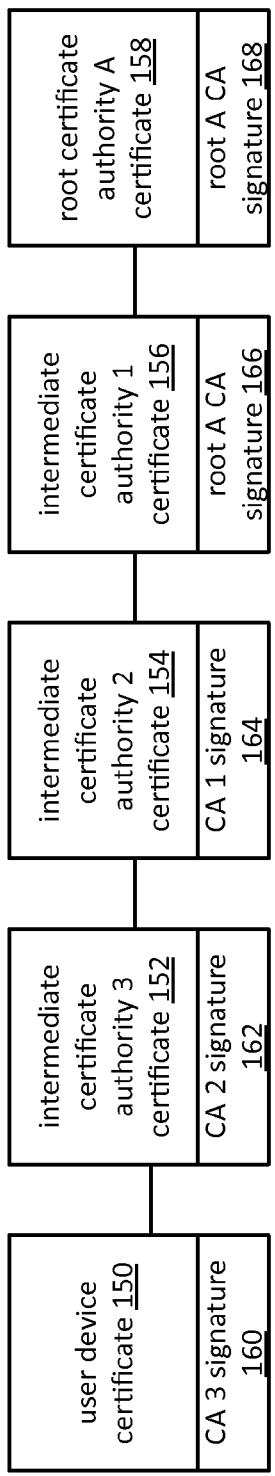
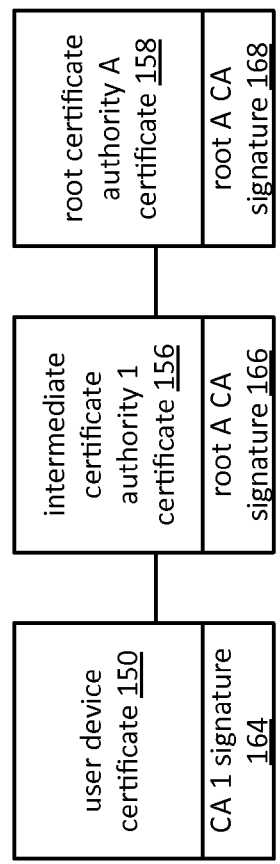
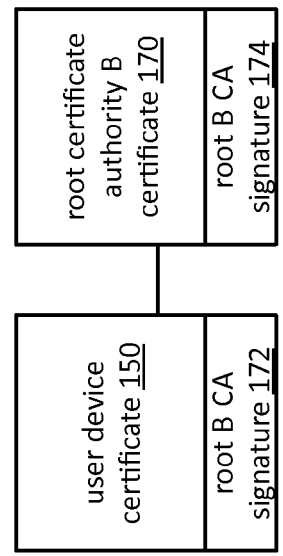
FIG. 8A
FIG. 8B
FIG. 8C

VALIDATING A CERTIFICATE CHAIN IN A DISPERSED STORAGE NETWORK

CROSS REFERENCE TO RELATED PATENTS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 13/288,076, entitled "VALIDATING A CERTIFICATE CHAIN IN A DISPERSED STORAGE NETWORK," filed Nov. 3, 2011, now U.S. Pat. No. 8,627,065, issued on Jan. 7, 2014, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 61/411,478, entitled "BALANCING MEMORY UTILIZATION IN A DISPERSED STORAGE NETWORK," filed Nov. 9, 2010.

STATEMENT REGARDING FEDERALLY SPONSORED RESEARCH OR DEVELOPMENT

This invention was made with Government support under Contract No. 2009*0674524*000 awarded by the Central Intelligence Agency. The Government has certain rights in the invention.

INCORPORATION-BY-REFERENCE OF MATERIAL SUBMITTED ON A COMPACT DISC—NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to use a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n-1=capacity). RAID 6 can recover from a loss of two discs and requires a minimum of four discs with a storage capacity of n-2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 6A is a schematic block diagram of another embodiment of a computing system in accordance with the invention;

FIG. 6B is a diagram illustrating an example of a digital certificate acquisition sequence in accordance with the invention;

FIG. 6C is a diagram illustrating another example of a digital certificate acquisition sequence in accordance with the invention;

FIG. 8A is a diagram illustrating an example of a certificate chain in accordance with the invention;

FIG. 8B is another diagram illustrating another example of a certificate chain in accordance with the invention;

FIG. 8C is another diagram illustrating another example of a certificate chain in accordance with the invention.

DETAILED DESCRIPTION OF THE INVENTION

Figure 1:
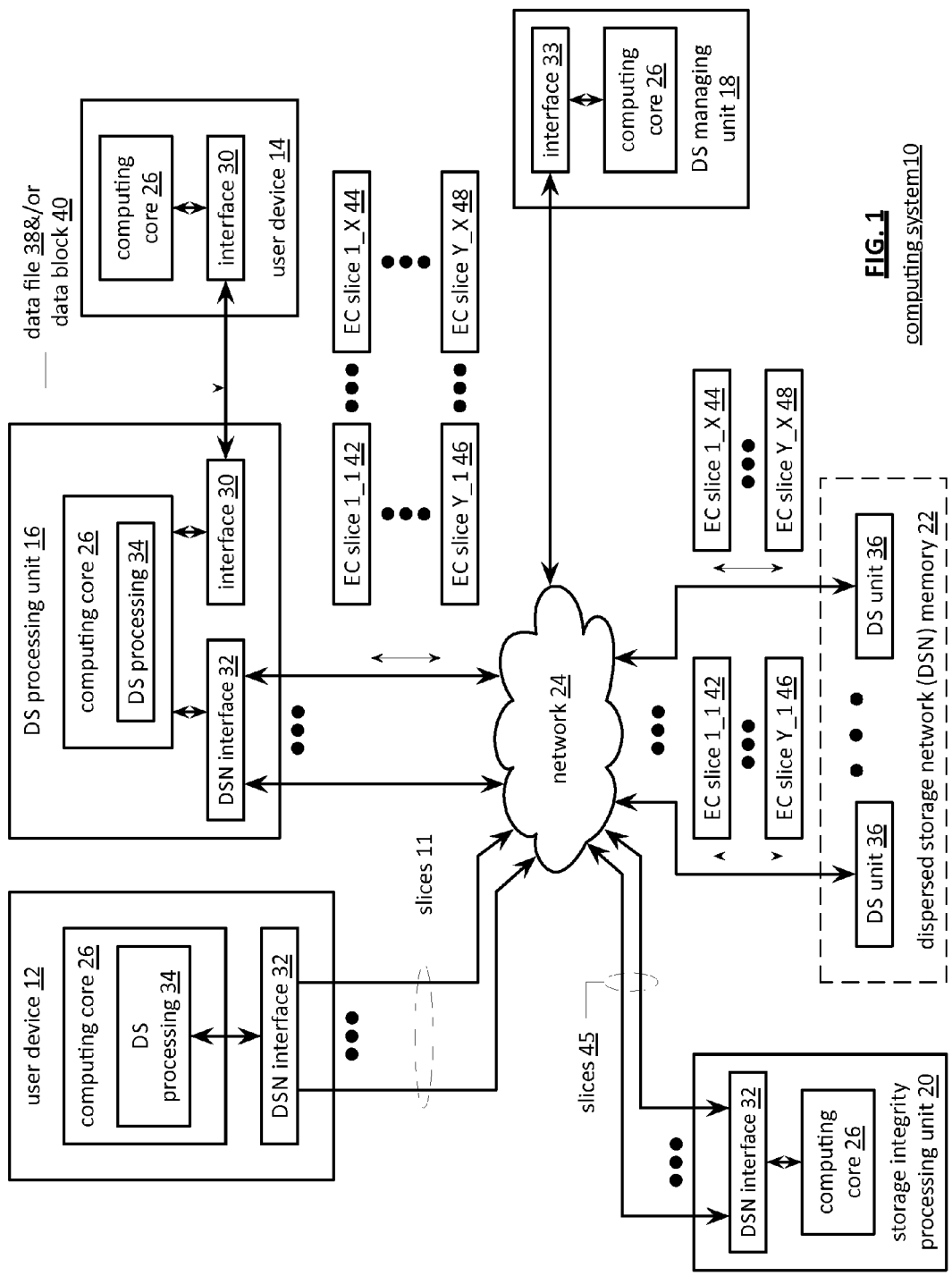
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-9.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
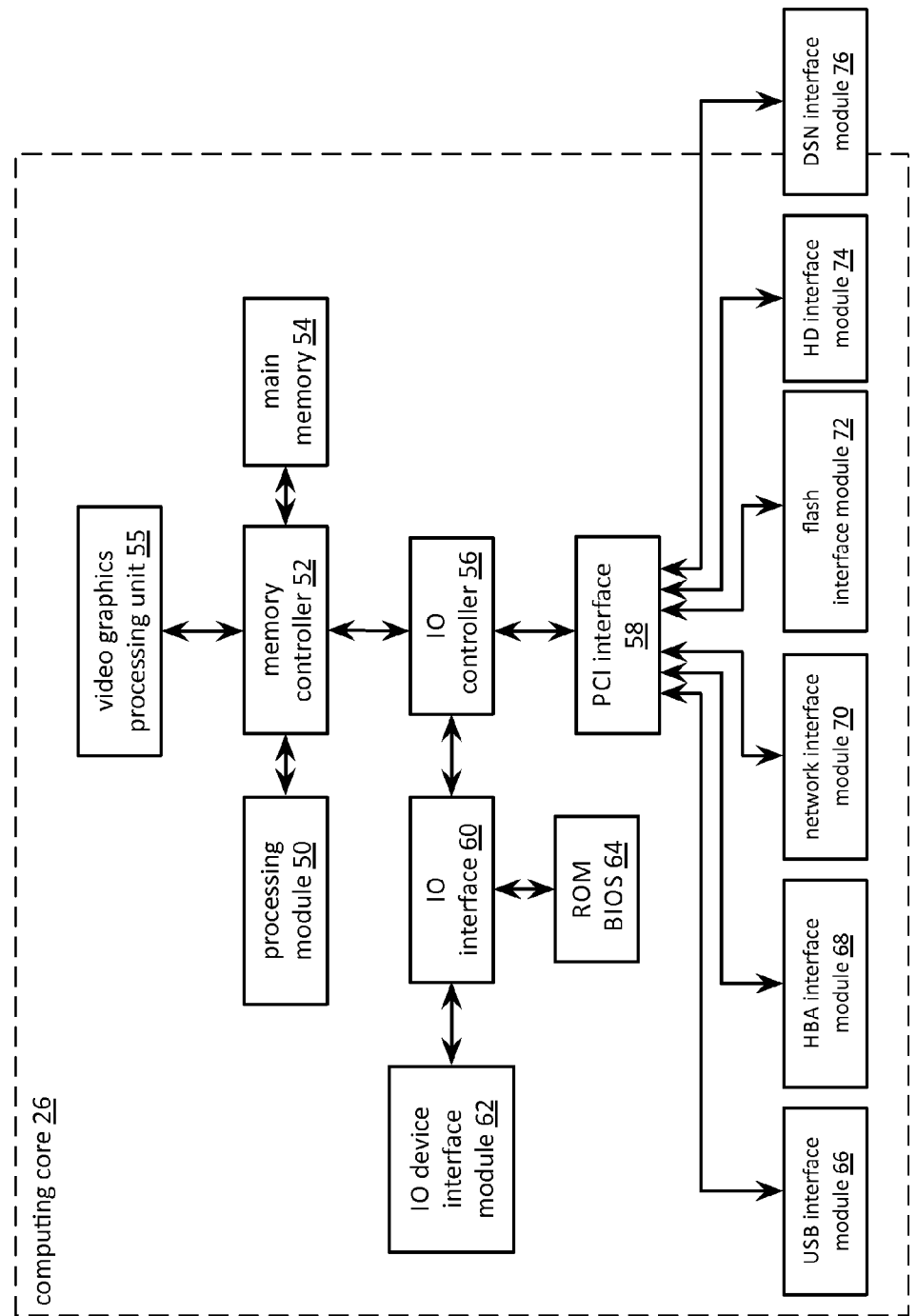
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
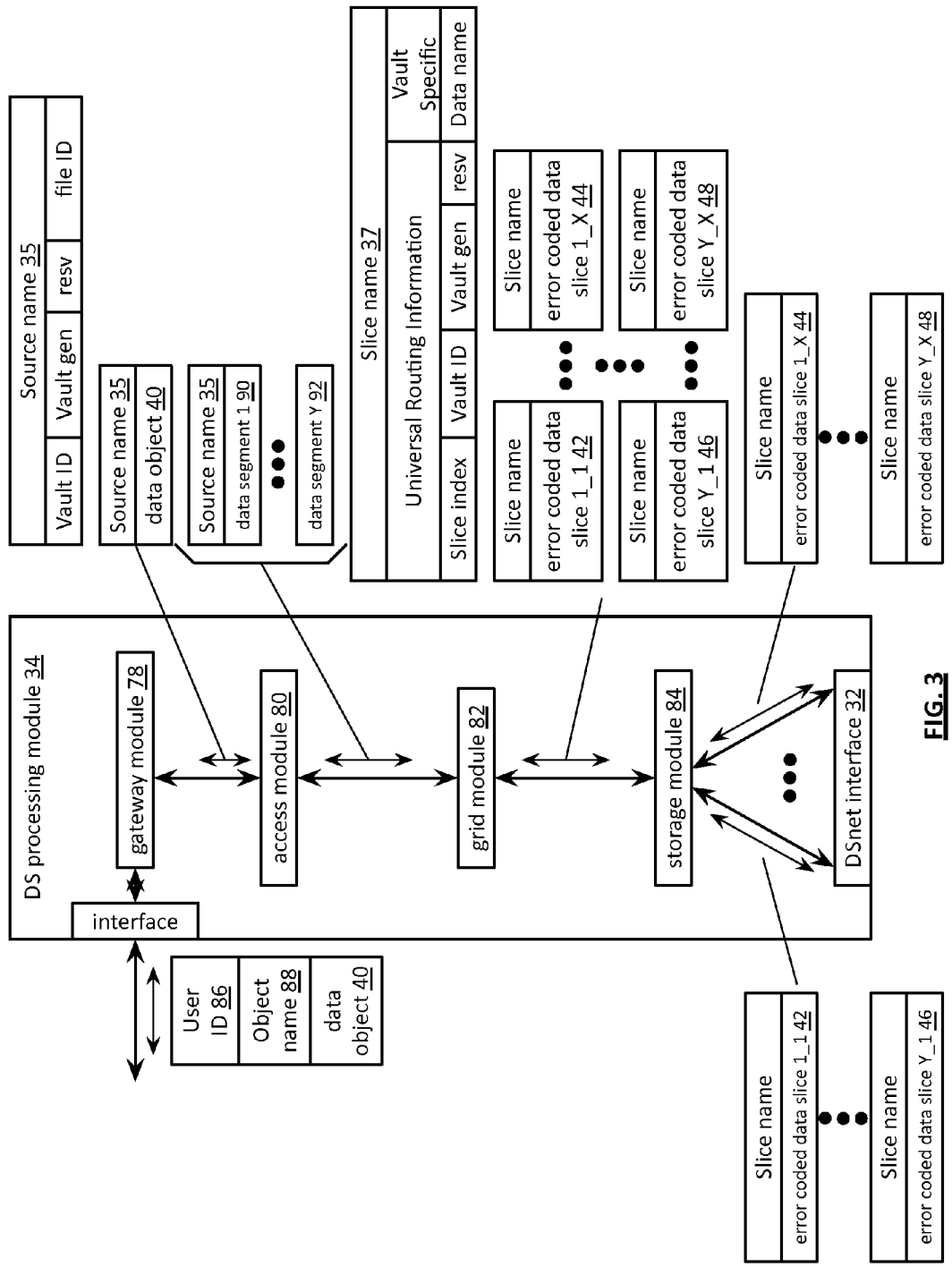
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

FIG. 6A is a schematic block diagram of another embodiment of a computing system that includes a dispersed storage (DS) unit 36, a DS managing unit certificate authority 102, an intermediate certificate authority (CA) 104, a root certificate authority A, and a root certificate authority B. Alternatively, the DS unit 36 may be implemented by any other unit, device, or module of a dispersed storage network (DSN). For example, another embodiment substitutes the DS unit 36 with a user device 12. The DS managing unit certificate authority 102 may be implemented by including a certificate authority within a DS managing unit 18. One or more of the intermediate certificate authority 104, the root certificate authority A, and the root certificate authority B may be implemented as part of the DS managing unit 18. Any number of root certificate authorities, any number of intermediate certificate authorities, and any number of certificate authorities may provide digital certificates to the DSN.

The root certificate authority A provides a self signed root certificate authority A certificate to the DSN and the root certificate authority B provides a self signed certificate authority B certificate to the DSN. The intermediate certificate authority 104 provides a certificate chain A to the DSN that includes an intermediate certificate authority certificate and a root certificate authority A certificate. The DS managing unit certificate authority 102 provides one or more of a certificate chain A' and a certificate chain B to the DSN, wherein the certificate chain A' includes a DS managing unit certificate authority certificate, the intermediate certificate authority certificate, and the self signed root certificate authority A certificate, and wherein the certificate chain B includes the DS managing unit certificate authority certificate and the self signed root certificate authority B certificate.

FIG. 6B is a diagram illustrating an example of a digital certificate acquisition sequence between elements of a dispersed storage network (DSN) as depicted in FIG. 6A. The sequence begins with a dispersed storage (DS) managing unit certificate authority 102 sending registry information 106 to a DS unit 36. The registry information 106 includes one or more of network certificates and vault information.

Such a network certificate includes one or more realm identifiers (ID) and at least one subject name ID per realm ID. Such a realm ID may be associated with one or more of a groups of affiliated user devices, operations within a geographic region, one or more groups of DSN entities, and a DSN of a plurality of DSNs. For example, two user devices sharing a common email system domain form an affiliated group of a common realm. For instance, jresch@cleversafe and wleggette@cleversafe represent two user devices sharing a common realm of Cleversafe. The subject name ID includes a unique identifier corresponding to any one of a user device, a certificate authority, a DSN process, a DS processing unit, a DS unit, a DS managing unit, and any other unit of a DSN.

The vault information includes an access control list (ACL) and vault parameters. The ACL includes one or more of a realm ID, a corresponding subject name ID, and corresponding permissions with respect to the DSN (e.g., read, write, delete, list, rebuild, etc.). The vault parameters includes one or more of a name, a pillar width, a codec table, an information dispersal algorithm (IDA) identifier, a decode threshold, a codec stack, and a segment size. The format of the registry information 106 is discussed in greater detail with reference to FIG. 6E.

In the digital certificate acquisition sequence continued, the DS unit 36 generates a certificate signing request 108 and sends the certificate signing request 108 to the DS managing unit certificate authority 102. The certificate signing request (CSR) 108 includes at least one of a requesting entity ID, registration information (e.g., an authentication code distributed as a result of a previous activation sequence), an email address, a geographic designation, a domain name, a public key of a public-private key pair, and a signature over the request utilizing a private key of the public-private key pair. The DS managing unit certificate authority 102 validates the certificate signing request 108, generates a certificate chain A', and sends the certificate chain A' to the DS unit 36. The generation of the certificate chain A' includes generating a signature over a certificate of the certificate signing request (CSR) 108 (e.g., a cryptographic hash utilizing an industry standards such as digital signature algorithm (DSA) or Rivest, Shamir, Adleman (RSA) utilizing a private key associated with public-key infrastructure (PKI) public-private key pair of the DS managing unit certificate authority 102), embedding the signature in the certificate of the CSR to produce a signed certificate, and appending the signed certificate to a certificate chain A to produce the certificate chain A'. The DS unit 36 subsequently may utilize the certificate chain A' in an authentication sequence with one or more entities of the DSN. The DS unit 36 may access the one or more entities of the DSN subsequent to a favorable authentication sequence.

Prior to or subsequent to the sending of CSR 108, the DS managing unit certificate authority 102 generates a certificate signing request 110 and sends the certificate signing request 110 to the intermediate certificate authority 104. The intermediate certificate authority 104 generates certificate chain A by signing the CSR 110 and appending an intermediate certificate authority certificate and a root certificate authority A certificate. The intermediate certificate authority 104 sends the certificate chain A to the DS managing unit certificate authority 102.

Prior to or subsequent to the sending of CSR 108, the intermediate certificate authority 104 generates a certificate signing request 112 and sends the certificate signing request 112 to the root certificate authority A. The root certificate authority A generates certificate A by signing the CSR 112 and appending the root certificate authority A certificate. The root certificate authority A sends the certificate A to the intermediate certificate authority 104.

FIG. 6C is a diagram illustrating another example of a digital certificate acquisition sequence between elements of a dispersed storage network (DSN) as depicted in FIG. 6A. The sequence begins with a dispersed storage (DS) managing unit certificate authority 102 sending registry information 106 to a DS unit 36. The DS unit 36 generates a certificate signing request (CSR) 108 and sends the certificate signing request 108 to the DS managing unit certificate authority 102. The DS managing unit certificate authority 102 validates the certificate signing request 108, generates a certificate chain B, and sends the certificate chain B to the DS unit 36. The generation of the certificate chain B includes appending a certificate B to a certificate of the certificate signing request 108, generating a signature over the certificate of the certificate signing request 108, and appending the signature to the certificate B and certificate to produce the certificate chain B. The DS unit 36 subsequently may utilize the certificate chain B in an authentication sequence with one or more entities of the DSN. The DS unit 36 may access the one more entities of the DSN subsequent to a favorable authentication sequence.

Prior to or subsequent to the sending of CSR 108, the DS managing unit certificate authority 102 generates a certificate signing request 114 and sends the certificate signing request 114 to a root certificate authority B. The root certificate authority B generates certificate B by signing the CSR 114 and appending a root certificate authority B certificate. The root certificate authority B sends the certificate B to the DS managing unit certificate authority 102.

Figure 6D:
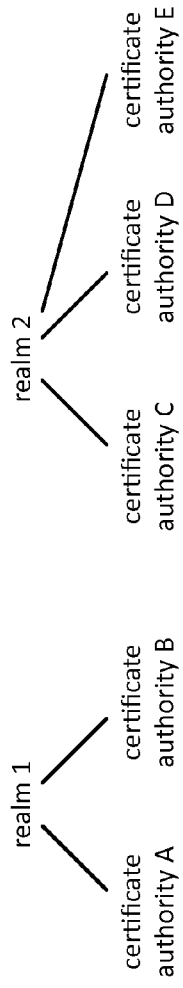
FIG. 6D is a diagram illustrating an example of realm to certificate authority relationships in accordance with the invention.

FIG. 6D is a diagram illustrating an example of realm to certificate authority relationships. In a first relationship, realm 1 is associated with certificate authority A and certificate authority B. In a second relationship, realm 2 is associated with certificate authority C, certificate authority D, and certificate authority E. In such relationships, a realm may include any number of certificate authorities and a certificate authority may only be associated with one realm. A system performance improvement may be provided by associating two or more certificate authorities with one realm when a first certificate authority is phased out of service in favor of a second certificate authority. For example, the second certificate authority is considered as a trusted certificate authority when it is associated with a common realm of the first certificate authority, wherein the first certificate authority is a predetermined trusted certificate authority.

Figure 6E:
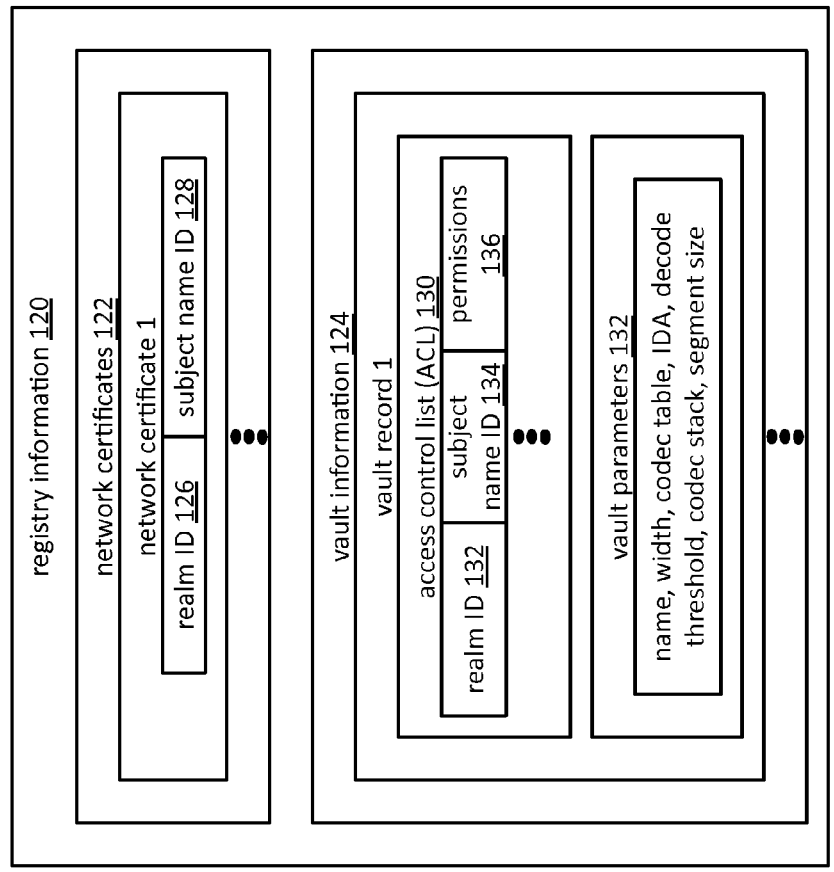
FIG. 6E is a diagram illustrating an example of registry information in accordance with the invention.

FIG. 6E is a diagram illustrating an example of registry information. The registry information 120 includes network certificates 122 and vault information 124. The network certificates 122 include a plurality of network certificates. Each network certificate of the plurality of network certificates includes a realm identifier (ID) 126 and a subject name ID 128. For example, a network certificate 1 includes a realm ID=1 and a subject name ID=certificate authority A. As another example, a network certificate 2 includes a realm ID=1 and a subject ID=certificate authority B.

The vault information 124 includes a plurality of vault records. Each vault record of the plurality of vault records includes an access control list (ACL) 130 and vault parameters 132. The access control is 130 includes one or more entries, wherein each entry of the one more entries includes a realm identifier (ID) 132, a subject name ID 134, and a set of permissions 136 associated with the entry. The set of permissions includes one or more of allowed DSN access types (e.g., read, write, delete, list, rebuild, etc.), allowed requesting entities (e.g., user device ID=457, certificate authority B, etc.), time based access, security level access, wild card access, and realm access. For example, a first entry includes a realm ID=2, a subject name ID=certificate authority C, and a permissions set that includes read-only permissions. As another example, a second entry includes a realm ID=2, a subject name ID=certificate authority D, and a permissions set that includes read and write permissions. As yet another example, a third entry includes a realm ID=2, a subject name ID=certificate authority E, and a permissions set that includes read, write, and delete permissions.

The vault parameters 132 includes one or more of a vault name, a pillar width, a codec table (e.g., which codecs may be utilized in producing encoded data slices), and information dispersal algorithm (IDA) ID, a decode threshold, a codec stack (e.g., indicating an order of an application of two or more codecs), and a data segment size.

Figure 7:
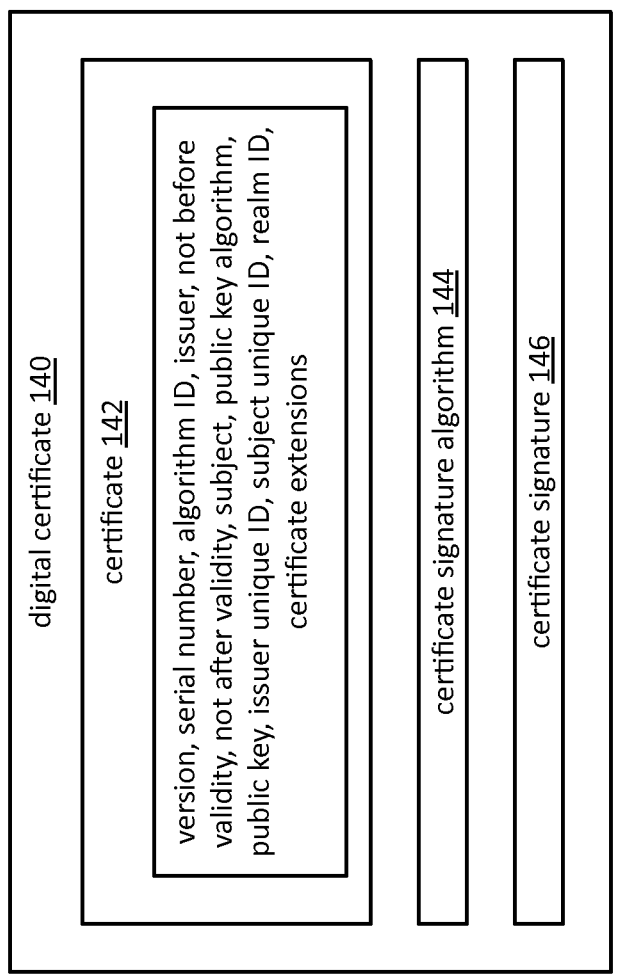
FIG. 7 is a diagram illustrating a digital certificate structure in accordance with the invention.

FIG. 7 is a diagram illustrating a digital certificate 140 structure that includes a certificate field 142, a certificate signature algorithm field 144, and a certificate signature field 146. Entries of the digital certificate fields may be encoded in accordance with an industry-standard such as abstract syntax notation (ASN.1). The certificate field 142 includes a version field, a serial number field, an algorithm identifier (ID) field, an issuer field, a not before a validity field, a not after validity field, a subject field, a public key algorithm field, a public key field, an issuer unique identifier field, a subject unique ID field, a realm ID field, and a certificate extensions field. The certificate signature algorithm field 144 includes a certificate signature algorithm entry that identifies a certificate signature algorithm of a plurality of algorithms utilized to produce the certificate signature field 146. The certificate signature field 146 includes a certificate signature entry generated as a signature of the certificate field 142 (e.g., cryptographic hash of the certificate field utilizing a private key of a signer).

FIG. 8A is a diagram illustrating an example of a certificate chain. The certificate chain includes a plurality of digital certificates including a user device certificate 150, an intermediate certificate authority (CA) 3 certificate 152, an intermediate certificate authority 2 certificate 154, an intermediate certificate authority 1 certificate 156, and a root certificate authority A certificate 158. Each certificate of the plurality of certificates has an associated digital signature, wherein the digital signature is produced as a cryptographic hash over the associated certificate. The cryptographic hash utilizes a private key associated with a certificate authority that is one level closer to the root certificate authority.

For example, the user device certificate 150 is associated with CA 3 signature 160, wherein signature 160 is generated utilizing a private key associated with intermediate certificate authority 3; the intermediate certificate authority 3 certificate 152 is associated with CA 2 signature 162, wherein signature 162 is generated utilizing a private key associated with intermediate certificate authority 2; the intermediate certificate authority 2 certificate 154 is associated with CA 1 signature 164, wherein signature 164 is generated utilizing a private key associated with intermediate certificate authority 1; the intermediate certificate authority 1 certificate 156 is associated with root A CA signature 166, wherein signature 166 is generated utilizing a private key associated with root certificate authority A; and the root certificate authority A certificate 158 is associated with root A CA signature 168, wherein signature 168 utilizes the private key associated with the root certificate authority A (e.g., self signed).

Clients (e.g., user devices) and/or servers (e.g., dispersed storage (DS) units) may subsequently use the certificate chain to ensure trusted access and/or trusted communications. The utilization may include searching the certificate chain to identify at least one certificate authority of the plurality of certificate authorities that is trusted. For example, ensuring trust may be accomplished by matching a certificate authority of the certificate chain to a certificate chain entry in a trusted certificate authority list (e.g., of a networked certificate of registry information).

FIG. 8B is another diagram illustrating another example of a certificate chain. The certificate chain includes a plurality of digital certificates including a user device certificate 150, an intermediate certificate authority (CA) 1 certificate 156, and a root certificate authority A certificate 158. Each of the plurality of certificates has an associated digital signature wherein the digital signature is produced as a cryptographic hash over the associated certificate. For example, the user device certificate 150 is associated with CA 1 signature 164, wherein signature 164 is generated utilizing a private key associated with intermediate certificate authority 1; the intermediate certificate authority 1 certificate 156 is associated with root A CA signature 166, wherein signature 166 is generated utilizing a private key associated with root certificate authority A; and the root certificate authority A certificate 158 is associated with root A CA signature 168, wherein signature 168 utilizes a private key associated with the root certificate authority A. Clients and/or servers may subsequently use the certificate chain to ensure trusted access and/or trusted communications.

FIG. 8C is another diagram illustrating another example of a certificate chain. The certificate chain includes a plurality of digital certificates including a user device certificate 150, and a root certificate authority B certificate 170. Each of the plurality of certificates has an associated digital signature wherein the digital signature is produced as a cryptographic hash over the associated certificate. For example, the user device certificate 150 is associated with root B certificate authority (CA) signature 172, wherein signature 172 is generated utilizing a private key associated with root certificate authority B; and the root certificate authority B certificate 170 is associated with root B CA signature 174, wherein signature 174 utilizes the private key associated with the root certificate authority B. Clients and/or servers may subsequently use the certificate chain to ensure trusted access and/or trusted communications.

Figure 9:
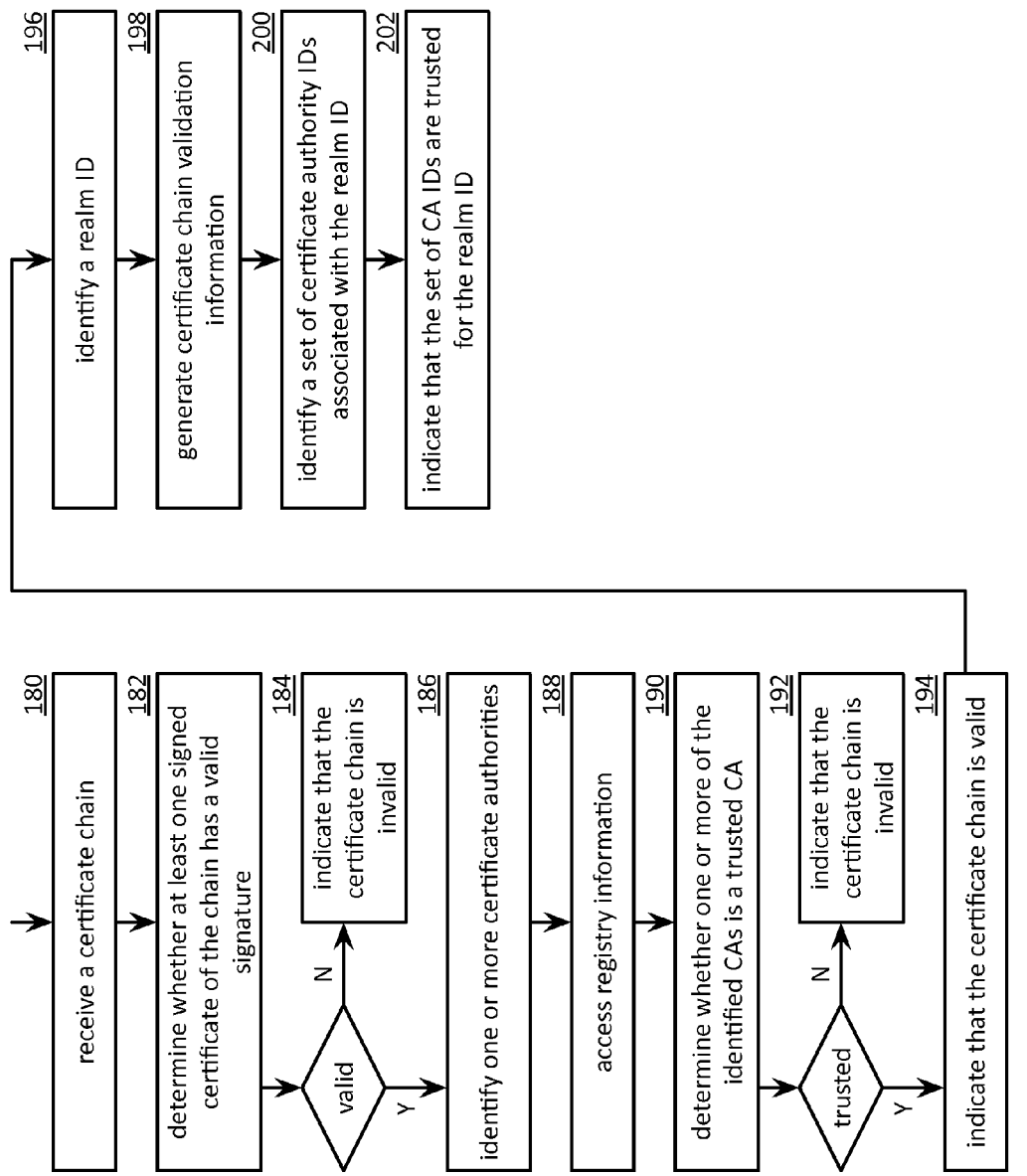
FIG. 9 is a flowchart illustrating an example of validating a certificate chain in accordance with the invention.

FIG. 9 is a flowchart illustrating an example of validating a certificate chain. The method begins with step 180 where a processing module (e.g., a dispersed storage (DS) unit) receives a certificate chain that includes one or more signed certificates from a requesting entity (e.g., a user device). The method continues at step 182 where the processing module determines whether at least one of the one or more signed certificates has a valid signature. The determining whether the at least one of the one or more signed certificates has a valid signature includes extracting a public key from a certificate of the certificate chain, validating a signature of another certificate in accordance with a signature algorithm of the other certificate utilizing the public key, and when the validating is favorable, indicating that the at least one of the one or more signed certificates has a valid signature.

For example, the processing module extracts a public key from a first certificate, wherein the first certificate is one certificate closer to a root certificate as compared to a second certificate, validates a signature of the second certificate in accordance with a digital signature algorithm (DSA) extracted from the second certificate utilizing a public key to produce a signature result, and when the signature result is favorable, indicating that the at least one of the one or more signed certificates has the valid signature. As another example, the processing module extracts the public key from the first certificate, decrypts the signature of the second certificate using the public key to produce a decrypted signature, compares the decrypted signature to a representation (e.g., a hash) of the second certificate, and when the comparing is favorable, indicating that the at least one of the one or more signed certificates has the valid signature.

Alternatively, when receiving the certificate chain from a requesting entity, the processing module determines whether at least one of the one or more signed certificates has a valid signature by verifying a signature of the requesting entity on a certificate of the certificate chain and when the signature of the requesting entity is verified, verifying signature of another certificate of the certificate chain, and when the signature of the other certificate is verified, indicating that the at least one of the one or more signed certificates has a valid signature. The verifying signature of the requesting entity includes at least one of instructing the requesting entity to decrypt an encrypted message (e.g., encrypted utilizing an associated public key) using a private key of the requesting entity to produce a decrypted message, receiving the decrypted message from the requesting entity, and verifying the decrypted message; and instructing the requesting entity to encrypt a message using the private key to produce a second encrypted message (e.g., a signature), receiving the second encrypted message from the requesting entity, and verifying the second encrypted message using a public key (e.g., decrypting the encrypted message utilizing the public key associated with the private key to produce a decrypted message and comparing the decrypted message to the message). For example, the processing module signs the message utilizing a digital signature algorithm (DSA) to produce the second encrypted message.

The method branches to step 186 when the processing module determines that at least one signed certificate of the chain has the valid signature. The method continues to step 184 when the processing module determines that none of the signed certificates of the chain has the valid signature. The method continues at step 184 where the processing module indicates that the certificate chain is invalid when each of the one or more signed certificates does not include a valid signature or when one or more signed certificates does not include a valid signature.

The method continues at step 186 where the processing module identifies one or more certificate authorities (CA) from the one or more signed certificates to produce identified CAs when the at least one of the one or more signed certificates has a valid signature. The method continues at step 188 were the processing module accesses registry information that includes one or more realm identifiers (IDs) and a plurality of trusted certificate authority (CA) IDs.

The method continues at step 190 where the processing module determines whether one or more of the identified CAs is a trusted CA based on the registry information. The determining whether one or more of the identified CAs is a trusted CA includes at least one of determining whether a signed certificate of the certificate chain was generated by a trusted CA (e.g., a certificate subject name ID field includes a trusted CA ID) and determining whether the signed certificate was signed by the trusted CA (e.g., signature verification utilizing a public key associated with the trusted CA). The determining whether the signed certificate was generated by the trusted CA includes indicating that the signed certificate was generated by the trusted CA when a CA ID of the signed certificate matches a CA ID of the trusted CA. The determining whether the signed certificate was signed by the trusted CA includes indicating that the signed certificate was signed by the trusted CA when a CA ID of a signature of the signed certificate matches a CA ID of the trusted CA. For example, the processing module indicates that the signed certificate was signed by the trusted CA when a decrypted signature, utilizing a public key associated with the trusted CA, compares favorably to the computed hash of the certificate.

The method branches to step 194 when the processing module determines that one or more of the identified CAs is the trusted CA. The method continues to step 192 when the processing module determines that none of the identified CAs is the trusted CA. The method continues at step 192 where the processing module indicates that the certificate chain is invalid when each of the one or more of the identified CAs is not a trusted CA.

The method continues at step 194 where the processing module indicates that the certificate chain is valid when the one or more of the identified CAs is a trusted CA. The method continues at step 196 where the processing module identifies a realm ID of the one or more realm IDs based on a trusted CA ID of the one or more of the identified CAs that is a trusted CA, wherein the realm ID identifies a predetermined grouping of entities associated with the DSN. For example, the processing module accesses the registry information utilizing the trusted CA ID to determine the realm ID.

The method continues at step 198 where the processing module generates certificate chain validation information to include the realm ID, the one or more of the identified CAs is the trusted CA, and the indication of the validity of the certificate chain. The method continues at step 200 where the processing module identifies a set of CA IDs associated with the realm ID. For example, the processing module accesses the registry information utilizing the realm ID and determines the set of CA IDs associated with the realm ID. The method continues at step 202 where the processing module indicates that the set of CA IDs are trusted for the realm ID. For example, the processing module includes the set of CA IDs in the certificate chain validation information as trusted CAs.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for authenticating a certificate chain within a dispersed storage network (DSN) by one or more computing devices of the DSN, wherein the method comprises:
    receiving the certificate chain from a requesting device, wherein the certificate chain includes a plurality of signed certificates that includes a signed certificate of the requesting device, a signed certificate of a root certificate authority, and one or more signed certificates of one or more intervening certificate authorities, wherein the certificate chain corresponds to a set of error coded (EC) data slices, wherein a data segment is dispersed error encoded to produce the set of EC data slices, and wherein the plurality of sets of EC data slices are stored among a plurality of distributed storage (DS) units within the DSN;
    validating signature of one of the plurality of signed certificates based on a public key of a corresponding certificate authority and a verification algorithm affiliated with the one of the plurality of signed certificates;
    when the signature of the one of the plurality of signed certificates is validated, validating remaining signatures of the plurality of signed certificates based on registry information that includes a list of trusted network certificates and vault information; and
    when the remaining signatures of the plurality of signed certificates are validated, generating certificate chain validation information to include a realm identifier, a list of trusted certificate authorities that have signed one or more of the plurality of signed certificates, and an indication of the validity of the certificate chain that indicates authorization for the requesting device to retrieve a minimum number of EC data slices within the set of EC data slices required to reconstruct the data segment.

2. The method of claim 1, wherein the validating the signature of one of the plurality of signed certificates comprises:
    extracting the public key from another signed certificate of the plurality of signed certificates, wherein the other signed certificate is for the corresponding certificate authority;
    extracting a digital signature algorithm as the verification from the one of the plurality of signed certificates;
    generating a signature result based on the public key extracted from the other signed certificate and the signature algorithm extracted from the one of the plurality of signed certificates; and
    when the signature result is favorable, indicating that the signature of one of the plurality of signed certificates is valid.

3. The method of claim 1, wherein the validating the signature of one of the plurality of signed certificates comprises:
    extracting the public key from another signed certificate of the plurality of signed certificates, wherein the other signed certificate is for the corresponding certificate authority;
    decrypting the signature of the one of the plurality of signed certificates using the public key to produce a decrypted signature;
    performing, as at least part of the verification algorithm, a hash function on the one of the plurality of signed certificates to produce a representation of the one of the plurality of signed certificates;
    comparing the decrypted signature to the representation of the one of the plurality of signed certificates; and
    when the comparing is favorable, indicating that the one of the plurality of signed certificates is valid.

4. The method of claim 1 further comprises:
    the certificate chain is sequentially ordered with the signed certificate of the requesting device at one end of the sequential order, the signed certificate of the root certificate authority at another end of the sequential order, and the one or more signed certificates of one or more intervening certificate authorities sequenced there between, wherein the corresponding certificate authority of the one of the plurality of signed certificates is a certificate authority of a next ordered adjacent signed certificate in the sequential order.

5. The method of claim 1, wherein the validating remaining signatures of the plurality of signed certificates comprises:
    identifying remaining certificate authorities (CA) associated with the remaining signatures to produce identified CAs;
    determining whether the identified CAs are listed as trusted CAs in the registry information; and
    when the identified CAs are trusted CAs, indicating that the certificate chain is valid.

6. The method of claim 1 further comprises:
    sending the certificate chain validation information to the requesting device.

7. A computing device comprises:
an interface;
a memory; and
a processing module coupled to the memory and the interface, wherein the processing module is configured to:
- receive, via the interface, a certificate chain from a requesting device, wherein the certificate chain includes a plurality of signed certificates that includes a signed certificate of the requesting device, a signed certificate of a root certificate authority, and one or more signed certificates of one or more intervening certificate authorities, wherein the certificate chain corresponds to a set of error coded (EC) data slices, wherein a data segment is dispersed error encoded to produce the set of EC data slices, and wherein the plurality of sets of EC data slices are stored among a plurality of distributed storage (DS) units within a dispersed storage network (DSN);
- validate signature of one of the plurality of signed certificates based on a public key of a corresponding certificate authority and a verification algorithm affiliated with the one of the plurality of signed certificates;
- when the signature of the one of the plurality of signed certificates is validated, validate remaining signatures of the plurality of signed certificates based on registry information that includes a list of trusted network certificates and vault information; and
- when the remaining signatures of the plurality of signed certificates are validated, generate certificate chain validation information to include a realm identifier, a list of trusted certificate authorities that have signed one or more of the plurality of signed certificates, and an indication of the validity of the certificate chain that indicates authorization for the requesting device to retrieve a minimum number of EC data slices within the set of EC data slices required to reconstruct the data segment.

8. The computing device of claim 7, wherein the processing module is further configured to validate the signature of one of the plurality of signed certificates by:
- extracting the public key from another signed certificate of the plurality of signed certificates, wherein the other signed certificate is for the corresponding certificate authority;
- extracting a digital signature algorithm as the verification from the one of the plurality of signed certificates;
- generating a signature result based on the public key extracted from the other signed certificate and the signature algorithm extracted from the one of the plurality of signed certificates; and
- when the signature result is favorable, indicating that the signature of one of the plurality of signed certificates is valid.

9. The computing device of claim 7, wherein the processing module is further configured to validate the signature of one of the plurality of signed certificates by:
- extracting the public key from another signed certificate of the plurality of signed certificates, wherein the other signed certificate is for the corresponding certificate authority;
- decrypting the signature of the one of the plurality of signed certificates using the public key to produce a decrypted signature;
- performing, as at least part of the verification algorithm, a hash function on the one of the plurality of signed certificates to produce a representation of the one of the plurality of signed certificates;
- comparing the decrypted signature to the representation of the one of the plurality of signed certificates; and
- when the comparing is favorable, indicating that the one of the plurality of signed certificates is valid.

10. The computing device of claim 7 further comprises:
- the certificate chain is sequentially ordered with the signed certificate of the requesting device at one end of the sequential order, the signed certificate of the root certificate authority at another end of the sequential order, and the one or more signed certificates of one or more intervening certificate authorities sequenced there between, wherein the corresponding certificate authority of the one of the plurality of signed certificates is a certificate authority of a next ordered adjacent signed certificate in the sequential order.

11. The computing device of claim 7, wherein the processing module is further configured to validate the remaining signatures of the plurality of signed certificates by:
- identifying remaining certificate authorities (CA) associated with the remaining signatures to produce identified CAs;
- determining whether the identified CAs are listed as trusted CAs in the registry information; and
- when the identified CAs are trusted CAs, indicating that the certificate chain is valid.

12. The computing device of claim 7, wherein the processing module is further is further configured to:
- send, via the interface, the certificate chain validation information to the requesting entity.

* * * * *